United States Patent [19]

Sugiyama

[11] Patent Number: 5,072,129
[45] Date of Patent: Dec. 10, 1991

[54] ARMATURE COIL ARRANGEMENT FOR ENGINE STARTER MOTOR

[75] Inventor: Takeshi Sugiyama, Himeji, Japan

[73] Assignee: Mitsubishi Denki K.K., Tokyo, Japan

[21] Appl. No.: 584,839

[22] Filed: Sep. 19, 1990

[30] Foreign Application Priority Data

Sep. 21, 1989 [JP] Japan .................................. 1-247481

[51] Int. Cl.⁵ ........................ F02N 11/00; H02K 3/00
[52] U.S. Cl. .................................... 290/48; 310/198; 310/207
[58] Field of Search .................... 310/198, 207; 290/48

[56] References Cited

U.S. PATENT DOCUMENTS

| 1,258,176 | 3/1918 | Andrews | 310/198 |
| 1,471,851 | 10/1923 | Kingsford | 310/207 |
| 4,852,417 | 8/1989 | Tanaka | 335/131 |

OTHER PUBLICATIONS

Abstract, Japanese Patent No. 63-181643, Jul. 1988.
Abstract, Japanese Patent No. 63-181643, Jul. 1988.

Primary Examiner—A. D. Pellinen
Assistant Examiner—Robert L. Hoover
Attorney, Agent, or Firm—Sughrue, Mion, Zinn, Macpeak & Seas

[57] ABSTRACT

A starter apparatus comprising an electric motor including an armature rotary shaft (35) made hollow so that power transmission mechanism (40) can be internally positioned and an armature core (36) mounted to the rotary shaft (35) and having in the periphery thereof a large number of slots (37) for winding therein an armature coil (38, 39). The armature coil of the electric motor (34) is composed by winding a single wave-winding coil (38) and a double wave-winding coil (39) in combination so that three coil conductor sections are positioned per one slot (37) for majority of the slots.

5 Claims, 6 Drawing Sheets

FIG. I
PRIOR ART
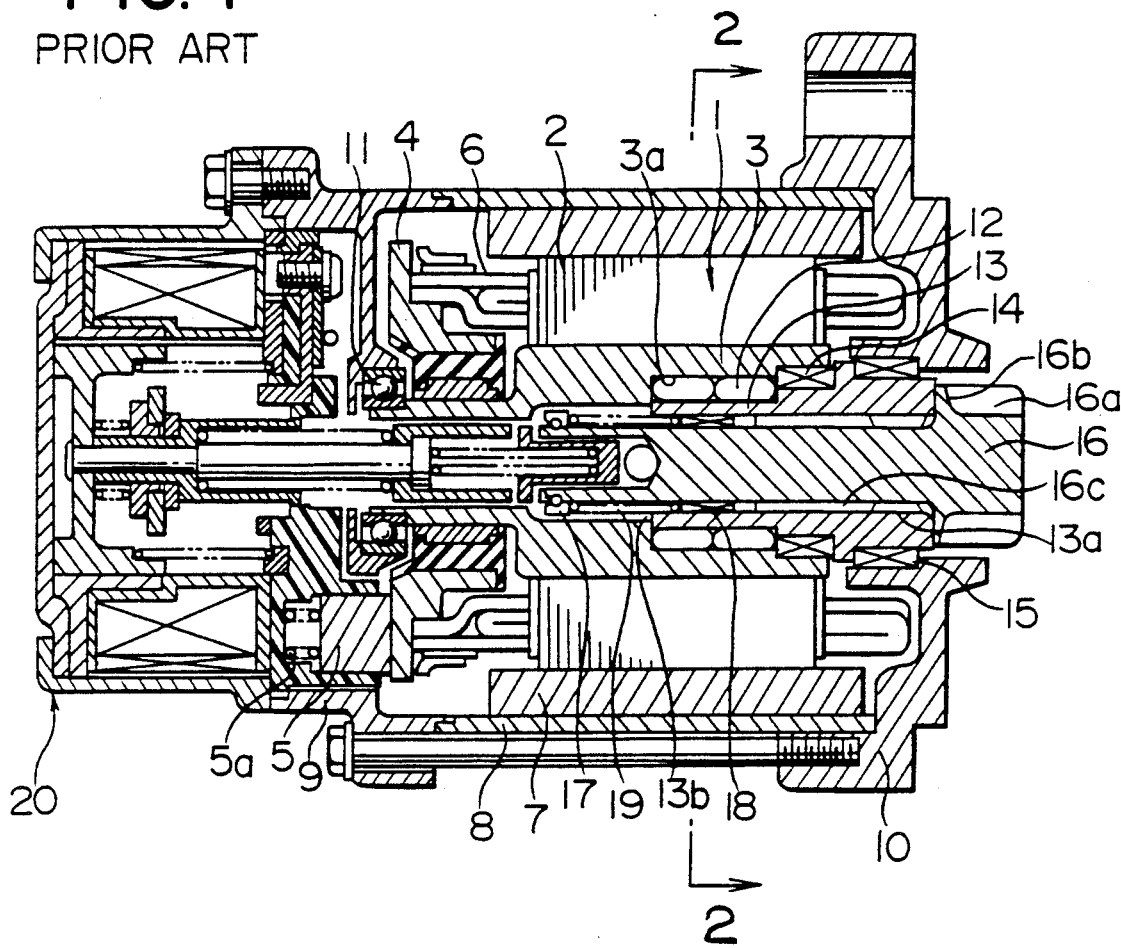
FIG. 2
PRIOR ART
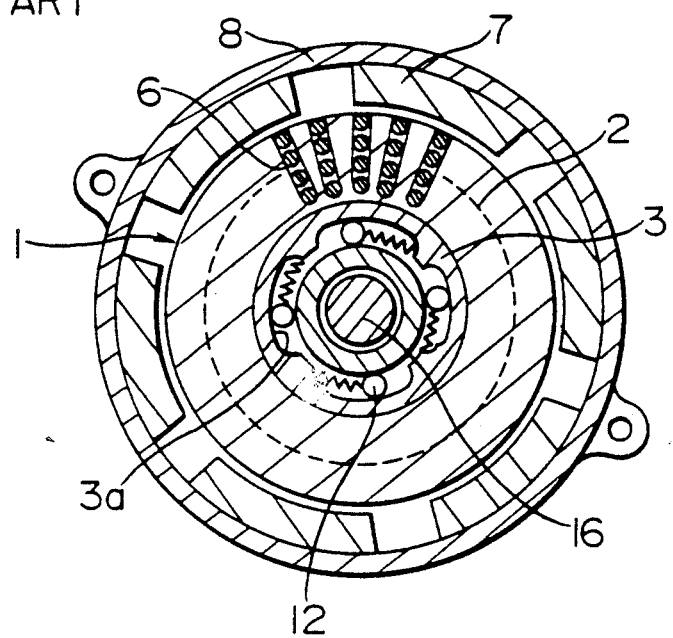

ARMATURE COIL ARRANGEMENT FOR ENGINE STARTER MOTOR

BACKGROUND OF THE INVENTION

This invention relates to an engine starter apparatus and more particularly to an armature coil arrangement of an electric motor for an engine starter apparatus.

Japanese Patent Laid-Open No. 63-181643 discloses one example of a conventional engine starter apparatus for starting an automotive engine in which a hollow armature rotary shaft is provided. In FIG. 1, which illustrates the conventional coaxial starter apparatus disclosed in the above Japanese reference, reference numeral 1 designates an armature of a d.c. electric motor, 2 is an armature core, 3 is an armature rotary shaft which is hollow and having formed therein wedge-shaped cams 3a constituting an over-running clutch function, and the armature core 2 is press-fit over the outer periphery of the rotary shaft 3. 4 is a face-type commutator mounted on the outer circumference of the rear portion of the rotary shaft 3. The commutator surface directly in sliding contact with brushes 5 is formed in a surface perpendicular to the rotary shaft 3. The commutator 4 is connected to an armature coil 6 wound on the core 2. The brushes 5 are forwardly urged by springs 5a behind the brushes 5 and the tips of the brushes 5 are brought into a pressure contact with the sliding contact surface of the commutator 4. A plurality of permanent magnets 7 for generating a magnetic field in the armature 1 are each secured on the inner circumference of the yoke 8 defining a magnetic path. The rear end of the yoke 8 is fitted to the rear bracket 9, and the front end of the yoke 8 is fitted to the front bracket 10. 11 is a bearing mounted to the rear end of the rotary shaft 3 and is supported by the rear bracket 9.

Reference numeral 12 represents rollers placed on the cam 3a formed in the inner surface of the rotary shaft 3 for providing an over-running function together with roller springs. 13 is a clutch inner member of the over-running mechanism which is provided with a bearing 14 at the outer circumference of the intermediate portion for supporting the front end of the rotary shaft 3. 15 is a bearing fitted inside of the front bracket 10 for supporting the front end of the clutch inner member 13. 13a are helical splines formed in the inner surface of the clutch inner member 13, which are in axial sliding engagement with helical splines 16c formed in the outer circumference of the intermediate portion of a pinion shaft 16 which has a pinion 16a formed on its tip and a flange 16b for dust-proof and water-proof. 17 is a stopper fitted at the rear portion of the pinion shaft 16, 18 is a bearing disposed at the inner surface of the clutch inner member 13 for supporting the rear portion of the pinion shaft 16, and the bearing 18 supports the front end of the return spring 19 of the pinion shaft 16. When the pinion shaft 16 is moved forward, the spring 19 is deflected by the stopper 17, and the forward movement is completed when the stopper 17 abuts against the rear end face 13b of the clutch inner member 13.

Reference numeral 20 is a solenoid switch connected to the rear bracket 9 by means of bolts, the solenoid switch 20 having a forward driving function in which the pinion shaft 16 and a switching function in which the contacts are closed upon closure of a key switch for allowing the power supply from the battery to the electric motor.

In the conventional engine starter apparatus as above described, the armature 1 of the d.c. electric motor generally comprises an armature winding having four coil conductor sections inserted in each slot 2a by double wave-winding in every slot pair located at a predetermined interval in the plurality of slots 2a formed in the outer circumference of the armature core 2 as illustrated in FIGS. 2 and 3 and by providing two double wave-wound coils 1a in one slot 2a so that four coil conductor sections are disposed within each slot 2a.

However, since the conventional engine starter apparatus comprises a d.c. electric motor of which the armature 1 has the construction that four coil conductor sections are disposed within each of the slots 2a of the armature core 2, the slots 2a need to have a relatively large depth sufficient for receiving four coil conductor sections in a single slot 2a. This makes it impossible to make the diameter of the armature rotary shaft 3 large and imposes a limitation in the radial size of the over-running clutch within the rotary shaft. There has been a problem in that the use of this kind of starter apparatus in certain large dispacement engines requiring a high torque to start is difficult from the view point of mechanical strength and durability.

Also, since the diameter of the armature rotary shaft 3 cannot be made large for the above reasons, the clutch outer member of the over-running clutch mechanism must be arranged in common or in a unitary structure with the shaft portion of the armature rotary shaft 3, so that the assembly of the rollers 12 are very difficult, resulting in a cause of the low productivity.

SUMMARY OF THE INVENTION

Accordingly, one object of the present invention is to provide an engine starter apparatus free from the above-discussed problems of the conventional engine starter motor.

Another object of the present invention is to provide an engine starter apparatus comprising an electric motor which includes a hollow armature rotary shaft for receiving therein a power transmission mechanism and which can be used with an engine having large displacement and improved productivity.

Another object of the present invention is to provide an engine starter apparatus of which the armature coil arrangement requires only relatively shallow slots.

Another object of the present invention is to provide an armature coil arrangement for an engine starter apparatus having an armature rotary shaft of a relatively large outer diameter, allowing the inner diameter of the armature rotary shaft to be made large and allowing the power transmission mechanism disposed within the rotary shaft to be durable and of high productivity.

With the above objects in view, the present invention resides in a starter apparatus comprising an electric motor including an armature rotary shaft made hollow so that a power transmission mechanism can be internally positioned and an armature core mounted to said rotary shaft and having in the periphery thereof a large number of slots for winding therein an armature coil, characterized in that said armature coil of said electric motor is composed by winding a single wave-winding coil and a double wave-winding coil in combination so that three coil conductors are positioned per one slot for majority of the slots.

According to the starter apparatus of the present inention, the armature coil of the electric motor is composed of a combined winding of a single wave-winding coil and a double wave-winding coil, so that three coil conductors are positioned per each slot. Therefore, each slot has a depth sufficient to receive three coil conductors. Thus, a hollow armature rotary shaft is allowed to have a large outer diameter, allowing the inner diameter of the armature rotary shaft to be made large, causing the power transmission mechanism disposed within the rotary shaft to be durable and of high productivity.

BRIEF DESCRIPTION OF THE DRAWINGS

The present invention will become more readily apparent from the detailed description of the following preferred embodiments of the present invention taken in conjunction with the accompanying drawings, in which:

FIG. 1 is a sectional view illustrating a conventional coaxial starter apparatus;

FIG. 2 is a sectional view of the conventional starter apparatus taken along line II—II of FIG. 1;

DESCRIPTION OF THE PREFERRED EMBODIMENTS

Figure 3:
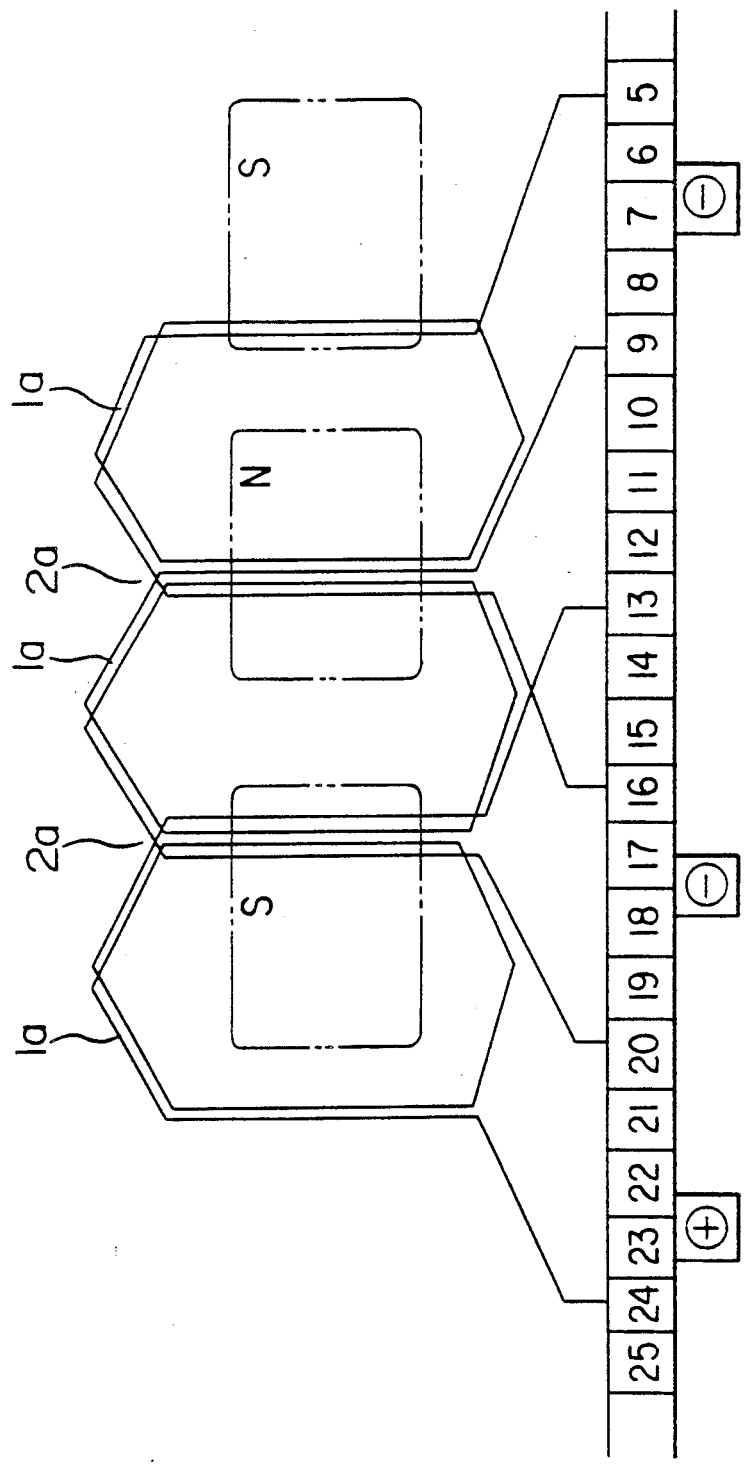
FIG. 3 is a connection diagram showing the armature coil wound on the armature core of the d.c. motor of the conventional starter apparatus.

A starter apparatus of the present invention will now be described in more detail in terms of embodiments illustrated in the accompanying drawings. Throughout the drawings, the same reference numerals designate identical or corresponding components.

Figure 4:
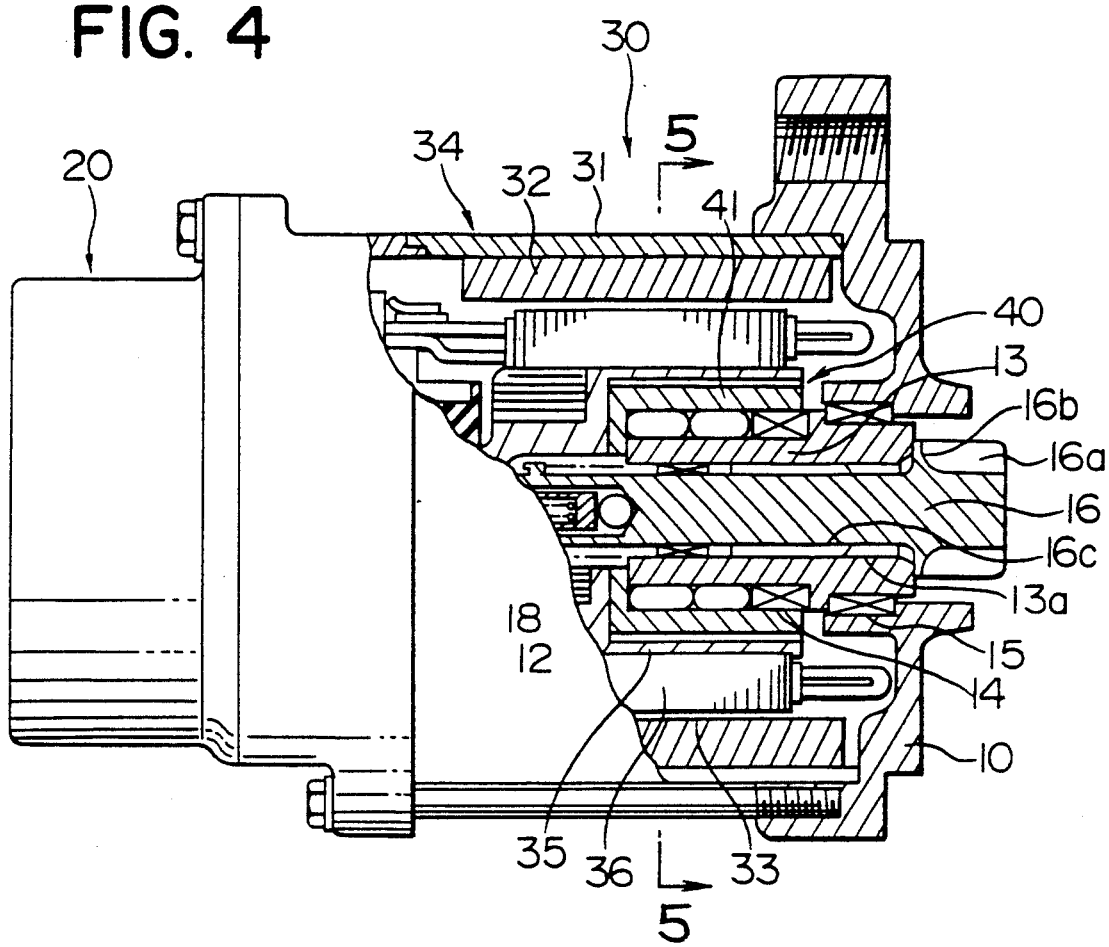
FIG. 4 is a partially sectional front view illustrating the coaxial starter apparatus of one embodiment of the present invention.
Figure 5:
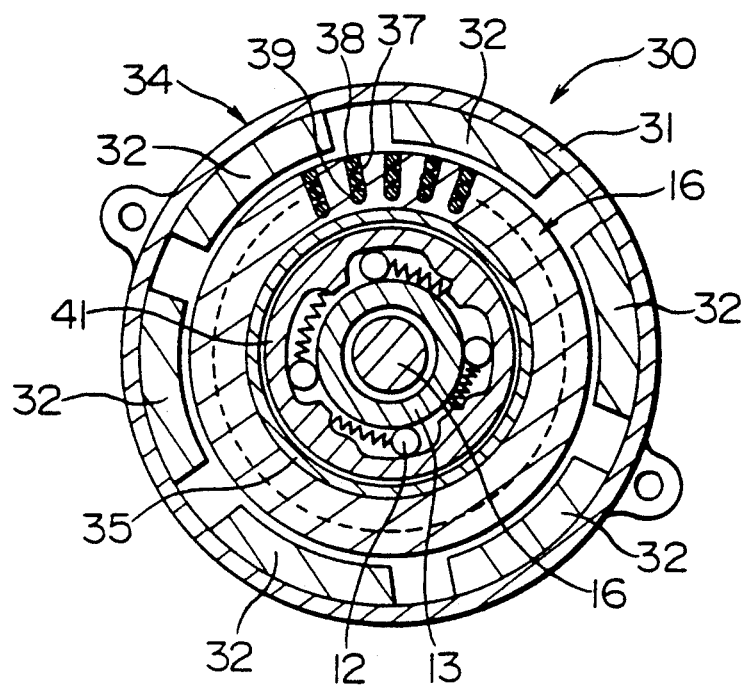
FIG. 5 is a sectional view of the starter apparatus taken along line V—V of FIG. 4.

FIGS. 4 and 5 illustrate a starter apparatus 30 of one embodiment of the present invention. In FIGS. 4 and 5 illustrating the embodiment, components that are the same as or corresponding to those of the conventional starter apparatus illustrated in FIGS. 1 to 3 are designated by the same reference numerals and their explanations are omitted.

The starter apparatus 30 of this embodiment comprises a d.c. motor 34 composed mainly of permanent magnets 32 securely attached, with circumferential intervals therebetween, to the inner circumference surface of the yoke 31 which defines a magnetic circuit and constituting an outer wall, an armature 33 rotatably positioned at the central portion of the yoke 31 and a commutator disposed at one end of the armature 33. The armature 33 of the d.c. electric motor 34 is composed of a hollow armature rotary shaft 35 and an armature core 36 mounted to the outer circumference of the rotary shaft 35.

Figure 6:
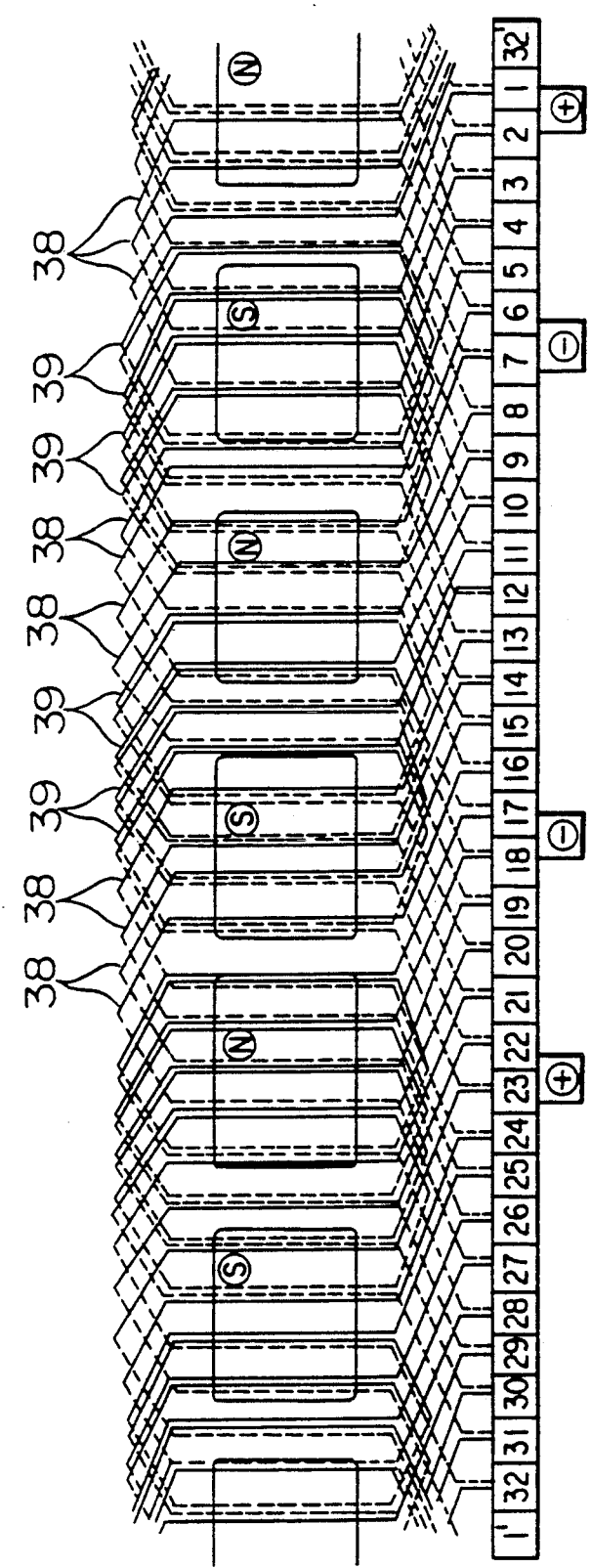
FIG. 6 is a connection diagram schematically illustrating the armature coils wound on the armature core of the d.c. motor of the starter apparatus of the embodiment of the present invention shown in FIG. 4.
Figure 7:
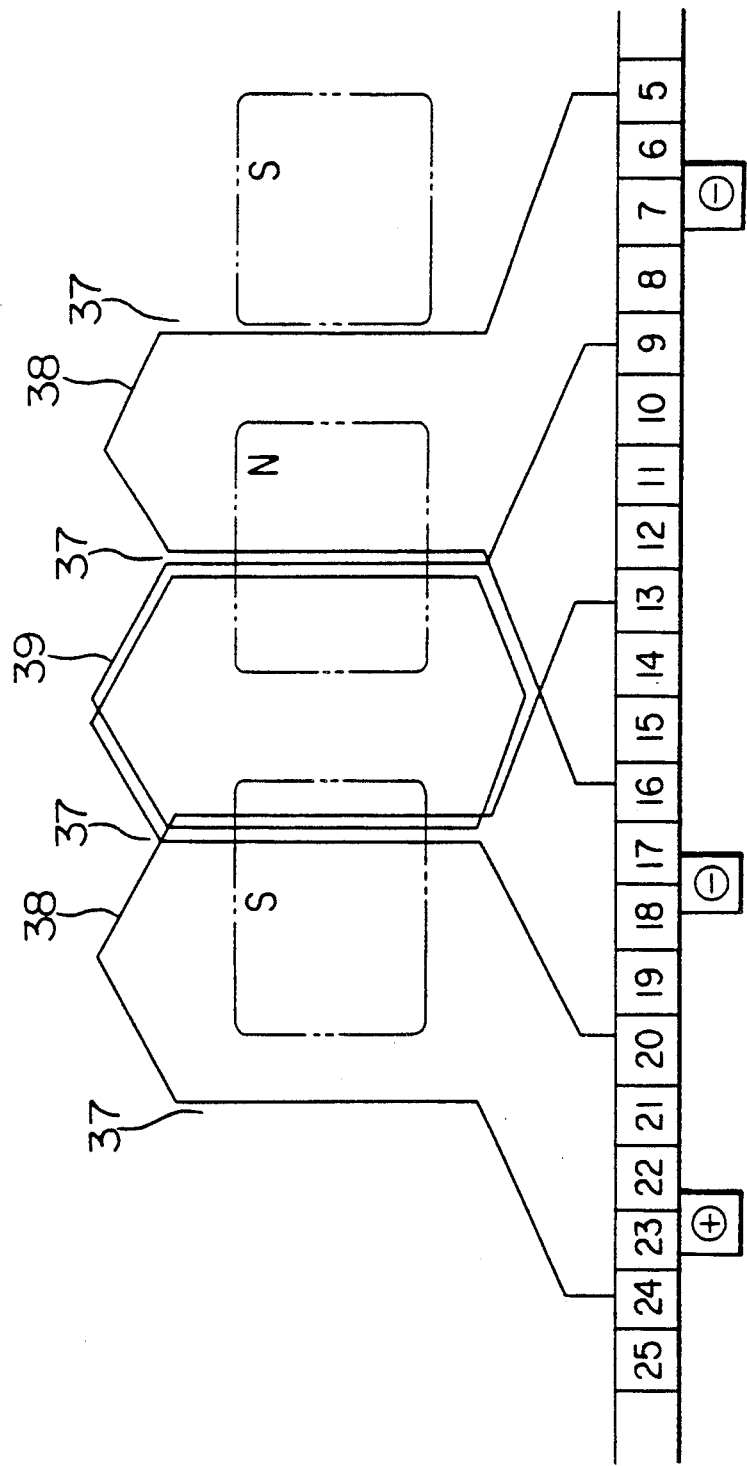
FIG. 7 is a connection diagram for explaining the winding arrangement of the armature coil illustrated in FIG. 6 with some parts omitted for easy understanding.
Figure 8:
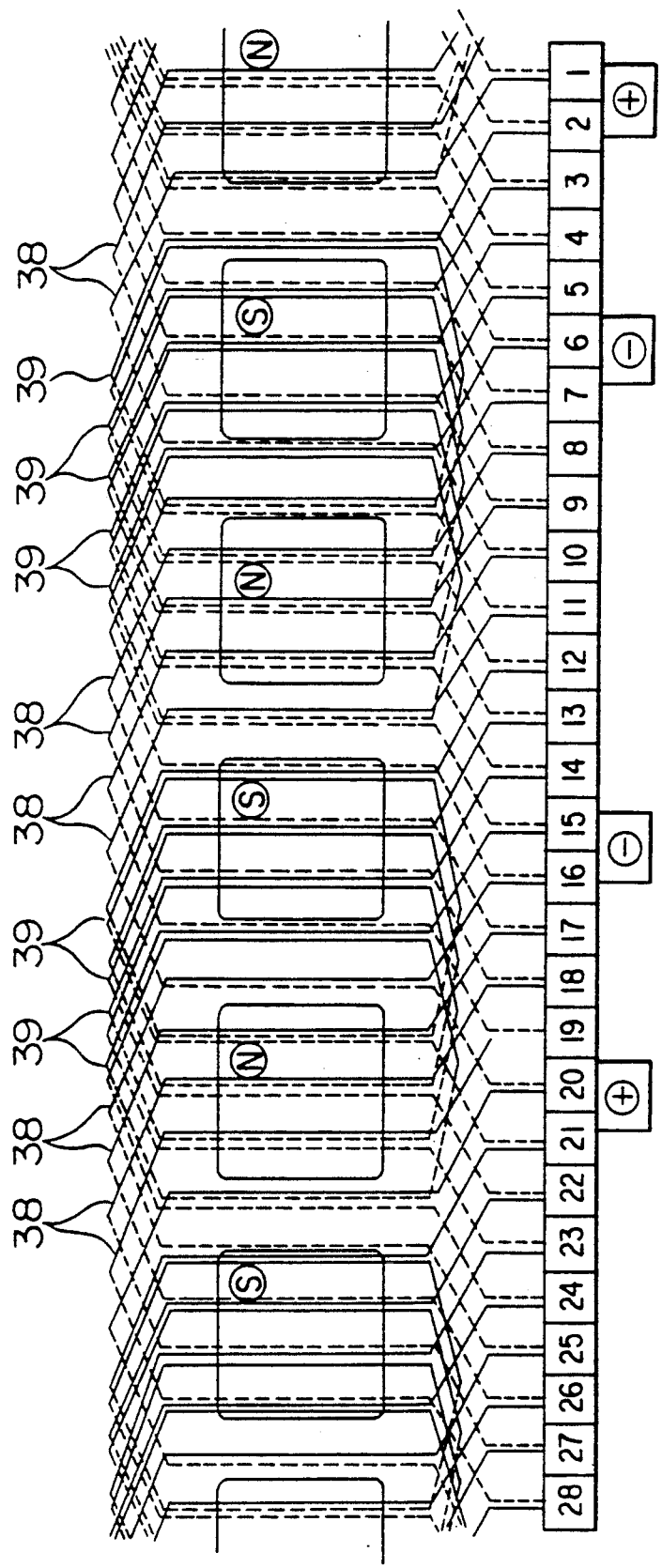
FIG. 8 is a connection diagram schematically illustrating the armature coils wound on the armature core of the d.c. motor of the starter apparatus of another embodiment of the present invention.

In the outer circumference of the armature core 36, a plurality of slots 37 in which thirty-two armature coils are to be wound are formed at equal circumferential intervals, and the slots 37 have wound therein in combination a single wave-wound coil 38 and a double wave-wound coil 39. The manner in which the coils are wound is schematically illustrated in FIG. 6. In order to explain this winding structure of the armature coil for easier understanding, the single wave-wound coils 38 and the double wave-wound coil 39 wound in two slots 37 are schematically illustrated in FIG. 7. As apparent from FIG. 7, the double wave-wound coil 39 connected at one end to the ninth segment of the commutator is wound twice through a selected one of the slots 37 and another slot 37 which is the fourth slot as circumferentially counted from the slot adjacent to the selected slot and at the other end to the twentieth segment of the commutator. Each single wave-wound coil 38 is wound through one of the slots 37 through which the double wave-wound coil 39 is wound. The other slots 37 which represent the fourth slot as counted in the opposite directions from the slot adjacent to each of the slots 37 through which the double wave-wound coil 39 is wound, and the single wave-wound coil 38 is connected at the opposite ends to the respective commutator segments. The winding pattern as above described is applied to all the slots 37 (FIG. 6), so that three coil conductors of the single wave-wound coil 38 and the double wave-wound coil 39 pass through each slot 37.

Thus, by providing the armature coil with the single wave-wound coil 38 and the double wave-wound coil 39 in combination and disposing three coil conductors within each of the slots 37, the depth of the slots 37 becomes less than that where four conductors are inserted and, accordingly, the outer diameter of the hollow armature rotary shaft 35 can be made larger from the view point of the mechanical strength and the inner diameter can also be made larger.

The inner circumferential surface of the hollow portion of the armature rotary shaft 35 has formed therein a recessed portion, in which an over-running clutch mechanism 40 is disposed. Although the over-running clutch mechanism 40 itself is basically the same as the conventional mechanism illustrated in FIG. 1, the over-running clutch mechanism 40 is made as a separate unit including a clutch outer member 41 not common to and independent from the armature rotary shaft.

Generally the performance of the d.c. electric motor is considered to decrease as the number of coil conductors disposed within the slots 37 decreased, since the slots 37 become shallower thereby increasing the distance between the innermost ends of the slots 37. As this distance becomes larger and it is easier for the magnetic flux to pass therethrough. Consequently, it is possible to design the d.c. motor to have a performance substantially equal to the conventional motor illustrated in FIG. 1, even with the number of coil conductors disposed within one slot decreased by one.

In the starter apparatus of the embodiment illustrated in FIGS. 4 and 5, thirty-two slots are formed in the armature core and the single wave-wound coils and the double wave-wound coils are wound in these slots in combined form. However, armature core may have formed therein twenty-eight slots, in which the single wave-wound coils 38 and the double wave-wound coils 39 are wound in combined form. In this embodiment, while only two coil conductors can be disposed in two slots because of the combination of the respective coils 38 and 39 and number of the slots 37, the performance of the d.c. electric motor is not substantially affected.

Also, in the embodiment illustrated in FIG. 4, the separate over-running clutch mechanism 40 is mounted within the armature rotary shaft 35 because the diameter of the armature rotary shaft 35 can be made large. The present invention is not necessarily limited to this structure. Alternatively the same structure as the conventional starter apparatus illustrated in FIG. 1, except for the arrangement of the armature coil wound on the armature core, may be used. Of course, since the diameter of the armature rotary shaft is large even in this case, each part constituting the over-running clutch can be made thicker as compared to those of the conventional design, thereby making the structure strong.

As has been described, according to the starter apparatus of the present invention, three coil conductors are disposed in each slot by combining a single wave-winding coil and a double wave-winding coil for the majority of the slots of the armature core, so that the outer diameter of the hollow armature rotary shaft may be made large, and the radial space within the armature rotary shaft can be enlarged. An independently arranged power transmission unit can be mounted within the rotary shaft, whereby the assembly can be made easier or, alternatively, the thickness of each part of the power transmission unit can be made large by an amount corresponding to the enlarged radial space to improve the durability, whereby this starter apparatus can be used in a large displacement engine.

What is claimed is:

1. A starter apparatus comprising an electric motor including an armature rotary shaft defining a hollow portion so that power transmission means can be internally positioned and an armature core mounted to said rotary shaft and having in the periphery thereof a large number of slots for winding therein an armature coil, characterized in that said armature coil of said electric motor is composed by winding a single wave-winding coil in electrical connection with a double wave-winding coil so that three coil conductor sections are positioned per one slot for a majority of the slots, in order to reduce a depth of each slot, said hollow portion of said rotary shaft including an over-running clutch member formed independent of said rotary shaft.

2. A starter apparatus as claimed in claim 1, wherein said armature core including thirty-two slots each having inserted therein three coil conductor sections.

3. A starter apparatus as claimed in claim 1, wherein said armature core including twenty-eight slots, twenty-six slots having inserted therein three coil conductor sections and two slots having inserted therein two coil conductor sections.

4. A starter apparatus as claimed in claim 1, wherein a loop of each of said single wave-winding coil is electrically connected in series with and between adjacent loops of said double wave-winding coil.

5. A starter apparatus as claimed in claim 1, wherein said over-running clutch member includes a clutch outer member adjacent to and independent from the armature rotary shaft.

* * * * *